April 30, 1968   F. T. RAULS   3,380,754
RETAINING DEVICE FOR PIVOTAL JOINTS
Filed Sept. 28, 1966
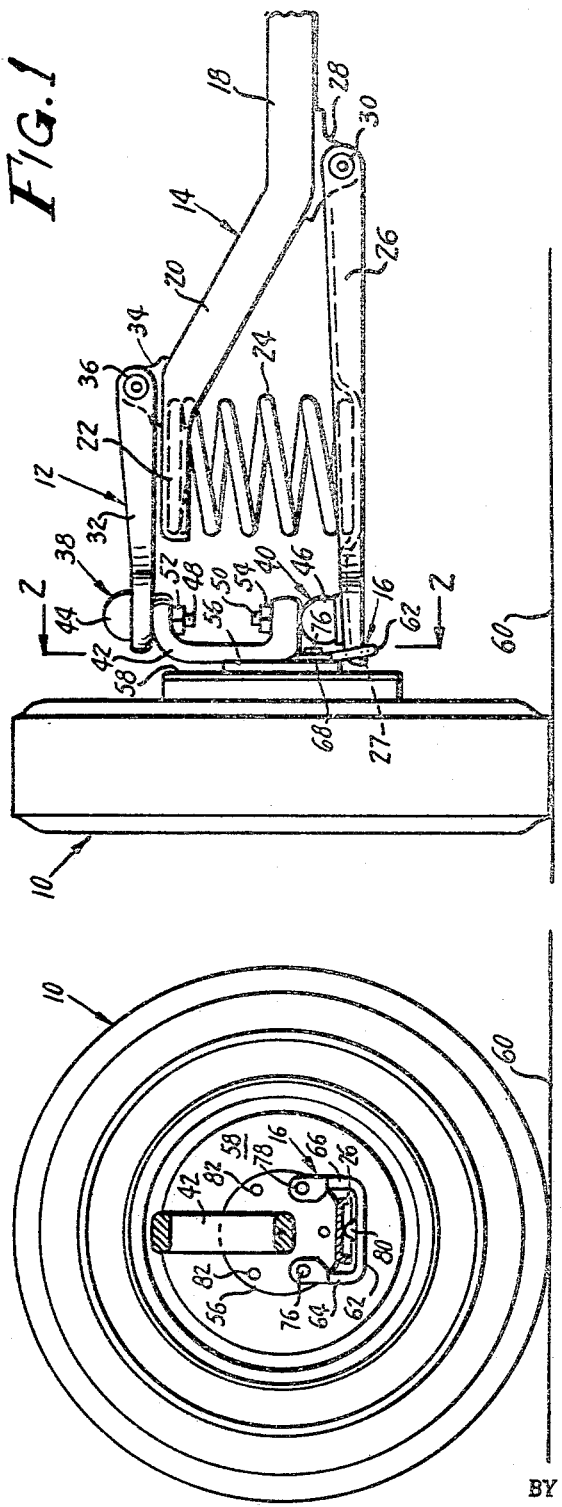
INVENTOR.
FRANCIS T. RAULS
BY
ATTORNEYS.

United States Patent Office 3,380,754
Patented Apr. 30, 1968

3,380,754
RETAINING DEVICE FOR PIVOTAL JOINTS
Francis T. Rauls, 640 Lola Drive,
Woodland, Calif. 95695
Filed Sept. 28, 1966, Ser. No. 582,590
7 Claims. (Cl. 280—96.2)

This invention relates to improvements in pivotal joint retention devices for maintaining the joint in assembled relation upon destruction thereof from causes such as abrasion, erosion, wear, and the like. More specifically the device of the instant invention relates to a ball joint retainer for securing the ball joint of a vehicular steering linkage in assembled relation upon joint failure.

Pivotal joint retention devices of this general character are known in the prior art as exemplified by United States Patents 2,208,325, 2,456,793, 2,474,959, 2,523,321 and 3,075,787. One of the main disadvantages of many of the prior art devices is that the ball joints itself must be of a particular type or must be modified to utilize the retention devices disclosed by the prior art. Another disadvantage of many of the prior art assemblages is that the retention device tends to bind the joint halves together or otherwise interferes with movement therebetween thereby increasing abrasive wear between the joint parts and shortening the useful life of the joint. Other joint retention devices known in the prior art do not act to bind the joint halves together but are defective in that they do not positively preclude disengagement of one of the joint halves from the retention device. It will be readily apparent that this type of joint retainer fails to perform its desired function since the joint halves tend to work themselves apart.

In brief terms the instant invention comprises a device for holding the pivotal joints of a vehicular steering mechanism together including a portion underlying and normally disengaged from the pivotal joint arm for holding the joint elements in close proximity upon destruction of the joint. More specifically the invention includes a generally U-shaped member adapted to be secured to a non-rotating portion of the vehicle wheel with a protuberance on the bight portion thereof for engaging a depression on the ball joint arm upon failure of the joint.

It is a primary object of the instant invention to provide an improved pivotal joint retaining device adapted to be assembled in a vehicular steering mechanism for maintaining the pivotal joint in assembled relation upon separation of the elements thereof.

Another object of the instant invention is to provide a pivotal joint retention device of the character described which is arranged to be secured in a vehicular steering mechanism without requiring the alteration or replacement of the pre-existing pivotal joint.

Still another object of the instant invention is to provide a pivotal joint retention device such that minor variations thereof may be fitted to all types of wheeled vehicles.

A further object of the instant invention is to provide a ball joint retention device which is inexpensive to make, easy to install, and which is inoperative until joint failure.

A still further object of the instant invention is to provide a vehicular steering mechanism including a pivotal joint in which a joint retention device is interconnected to maintain the joint elements in assembled relation upon joint failure.

Other objects and advantages of the instant invention reside in the combinations of elements, arrangements of parts, and features of construction and operation, all as will be more fully pointed out hereinafter and disclosed in the accompanying drawing wherein there is shown a preferred embodiment of this invention concept.

In the drawing:

FIGURE 1 is a front elevational view of a conventional vehicular wheel and wheel mounting assembly on which the device of the instant invention is mounted;

FIGURE 2 is a vertical cross-sectional view of the vehicular wheel and wheel mounting assembly of FIGURE 1 taken substantially along line 2—2 thereof as viewed in the direction indicated by the arrows;

FIGURE 3 is an enlarged front elevational view of one form of the pivotal joint retention device of the instant invention illustrating a portion of the lower pivotal joint arm in dashed lines;

FIGURE 4 is an enlarged front elevational view of another form of the pivotal joint retention device of the instant invention and constitutes a mirror image of the device of FIGURE 3;

FIGURE 5 is an enlarged front elevational view of still another form of pivotal joint retention device of the instant invention arranged to be securable to a different type of vehicle than are the retention devices of FIGURES 3 and 4; and FIGURE 6 is another form of the pivotal joint retention device of the instant invention for attachment to the same type of vehicle as the device of FIGURE 5 and constitutes a mirror image thereof.

Referring now to the drawing in detail, wherein like reference characters designate like elements throughout the several views thereof, there is shown generally at 10 a conventional vehicle wheel mounted by a linkage designated generally at 12 to a frame member indicated generally at 14 constituting part of a conventional vehicle. As will be explained more fully hereinafter, a pivotal joint retention device shown generally at 16 is secured to a non-rotating portion of wheel 10 and underlies an element of linkage 12 to hold a pivotal joint in assembled relation upon failure thereof.

Frame member 14 is illustrated as including a first horizontal segment 18, an upwardly and outwardly inclined strut 20, and a second horizontal segment 22 forming a depression for holding a coiled spring 24 between frame member 14 and a lower ball joint arm 26 pivotally mounted on first segment 18 by a block 28 and pivot pin 30. As shown in FIGURE 1, lower ball joint arm 26 forms a depression for receiving the lower end of spring 24 thereby retaining spring 24 in operative relation. It should be noted that lower arm 26 is of inverted U-shaped cross-sectional configuration and includes a plate 27 closing the end of the arm to form a depression for purposes more fully explained hereinafter. An upper ball joint arm 32 is pivotally mounted on second segment 22 by a block 34 and pin 36.

Interconnecting the ends of upper and lower arm 26, 32 are an upper ball joint designated generally at 38 on upper arm 32, a lower ball joint denominated generally at 40 on lower arm 26 and a C-shaped clevis 42 interconnecting upper and lower ball joints 38, 40. Ball joints 38, 40 are of generally conventional configuration and include a housing 44, 46 respectively secured to upper and lower arms 32, 26 and a ball or other rotatable enlarged boss (not shown) within each of housings 44, 46 secured to a pin 48, 50 extending through the arms of clevis 42. Suitable connecting means, such as nuts 52, 54, respectively secures each of pins 48, 50 to clevis 42.

The vertical leg of clevis 42 is fixedly secured, as by welding or the like, to a disc 56 which is in turn integrally assembled with a brake backing plate 58 and constitutes a non-rotating portion of wheel 10. It will be readily apparent that linkage 12 accommodates generally up and down movement between wheel 10 and an underlying surface 60 and also provides for the rotation of wheel 10 about an upstanding axis through joints 38, 40. It should be understood that a steering arm may be secured to clevis 42 to control the angular disposition of wheel 10 in response to driver command in a known manner.

As discussed in some detail in the aforementioned patents, one of the difficulties in using ball type joints is that the ball tends to be abraded by wear against the housing ultimately diminishing the size of the ball so that it will escape from the confines of the housing. Such failures normally occur in the lower ball joint such that lower arm 26 would fall by gravity and contact ground surface 60. The driver often loses control of steering as a result of having only one operable ball joint and because of the swerving tendencies caused by arm 26 contacting the road.

Retaining device 16 is used to hold lower arm 26 against clevis 42 thereby maintaining lower ball joint 40 in assembled relation even though the enlarged boss thereof has been abraded to such a size as to free the ball and housing for separating movement. Retaining device 16 is generally U-shaped and includes a bight portion 62 and a pair of upstanding arms 64, 66 positioned adjacent the ends of bight 62. At the upper end of each of arms 64, 66 is a flattened inclined plate 68, 70 each of which forms an aperture 72, 74 for receiving a frictional fastener 76, 78, such as a rivet, screw or the like. Positioned on bight portion 62 is a protuberance 80 extending into the depression formed by lower ball joint arm 26 in conjunction with plate 27.

In the assembly of retaining device 16 onto wheel 10 using screws as fasteners, suitable threaded openings 82 are formed in disc 56 in a conventional manner for receiving fasteners 76, 78. It should be noted that lower arm 26 is normally out of engagement with the holding portion of bight 62 until ball joint 40 separates, at which time the depending flanges of arm 26 contact bight 62 on opposite sides of protuberance 80. As shown best in FIGURE 3, protuberance 80 is sufficiently large to preclude plate 27 and the flanges of arm 26 from moving thereover either before or after joint 40 fails. Another important feature of retaining device 16 is the provision of arms 64, 66 on opposite sides of pivoted arm 26 thereby acting as an additional limit on possible movement of arm 26.

Referring now to FIGURE 4, another embodiment of the instant invention is illustrated generally at 116 with the elements thereof being designated with reference characters having common terminal and penultimate digits for purposes of brevity. Retaining device 116 is a substantial mirror image of retaining device 16 and is assembled and used in a substantially identical manner. Retaining devices 16, 116 constitute a set of retaining devices and are arranged to fit late model Ford automobiles with retaining device 16 being used on the left front wheel of the vehicle and retaining device 116 being used on the right front wheel.

Referring now to FIGURES 5 and 6, a pair of retaining devices are shown generally at 216, 316 with the elements thereof being designated with reference characters having common terminal and penultimate digits to designate elements common to devices 16, 116. It should be apparent that devices 216, 316 are substantial mirror images of each other and constitute a set of retaining devices for a late model Chevrolet. It should be noted that the angularity of arms 264, 364 are slightly off vertical to accommodate the slightly different arrangement of the wheel mounting linkage of this type of automobile. Similarly, the arrangement of plates 268, 270, 368, 370 is slightly different for similar reasons.

It should be readily apparent that the pivotal joint retaining devices of the instant invention may be used without replacing or otherwise modifying the ball joints with which they are to be used. It should also be readily apparent that the device of the instant invention may be modified to fit any type of vehicle for any other type of application for which they are suited.

It is now seen that there is herein provided an improved retaining device for pivotal joints which accomplishes all of the objects and advantages of the instant invention and others, including many advantages of great practical utility and commercial importance.

Since many embodiments may be made of the instant inventive concept, and since many modifications may be made in the embodiments hereinbefore shown and described, it is to be understood that the foregoing is to be interpreted merely as illustrative and not in a limiting sense.

I claim:

1. In a vehicular steering mechanism of the type having a pivoted ball joint arm having a depression adjacent the free end thereof, a ball joint on the free end of the ball joint arm, a steering element mounted for rotation about the axis of the ball joint secured to a non-rotatable portion of the vehicular wheel, the improvement comprising
    a ball joint retainer having a portion underlying the pivoted ball joint arm for holding the arm in close proximity to the ball joint upon separation thereof, the retainer portion including a holding segment normally out of engagement with the ball point arm and a protuberance extending into the ball joint arm depression normally out of engagement with the ball joint arm; and
    means securing the ball joint retainer to the non-rotatable portion of the wheel.

2. The structure of claim 1 wherein the ball joint arm is of inverted generally U-shaped cross-section and includes a plate extending transversely across the ball joint arm, the plate and the cross-sectional configuration of the ball joint arm forming the depression.

3. The structure of claim 1 wherein the ball joint retainer further includes a pair of upstanding arms, secured adjacent opposite ends of the holding portion, on opposite sides of the ball joint arms.

4. The structure of claim 3 wherein the securing means includes at least one frictional fastener, extending through each of the upstanding arms, engaging the non-rotating wheel portion and securing the retainer thereto.

5. In a vehicular steering mechanism of the type having a pivoted ball joint arm, a ball joint on the free end of the ball joint arm, a steering element mounted for rotation about the axis of the ball joint and secured to a non-rotatable portion of the vehicular wheel, the improvement comprising
    a ball joint retainer of generally U-shaped configuration having the bight portion thereof underlying the pivoted ball joint arm for holding the arm in close proximity to the ball joint upon separation thereof, the arms of the retainer being on opposite sides of the ball joint arm preventing inadvertent separation of the retainer and ball joint arm, the bight and arms of the retainer being normally out of engagement with the ball joint arm until joint separation; and
    means securing the ends of the retainer arms to the non-rotatable portion of the wheel.

6. The structure of claim 5 wherein the bight is offset from the non-rotatable wheel portion a sufficient distance from the free end of the pivoted arm to preclude downward movement thereof.

7. The structure of claim 6 wherein the ball joint arm forms a depression facing the bight and the retainer includes a protuberance on the bight extending into the depression and normally out of engagement therewith.

References Cited

UNITED STATES PATENTS

| | | | |
|---|---|---|---|
| 2,208,325 | 7/1940 | Krutsch | 287—90 |
| 2,456,793 | 12/1948 | Reed et al. | 287—90 XR |
| 2,474,959 | 7/1949 | Rieves | 287—90 |
| 2,523,321 | 9/1950 | Nelson | 287—90 |
| 3,075,787 | 1/1963 | Mineck | 280—96.2 |
| 3,115,349 | 12/1963 | Lerg | 280—96.2 |

BENJAMIN HERSH, *Primary Examiner.*

L. D. MORRIS, *Assistant Examiner.*